Nov. 15, 1955   A. S. BERLIN ET AL   2,723,554
APPARATUS FOR TESTING SELF-SEALING
PROPERTIES OF SHEET MATERIAL
Filed Dec. 16, 1952   2 Sheets-Sheet 1

Inventors
A. Samuel Berlin
Robert J. Classen
Charles F. Novak
Frank L. Hawkins
By George Renehan
Attorney Nov. 15, 1955 A. S. BERLIN ET AL 2,723,554
APPARATUS FOR TESTING SELF-SEALING
PROPERTIES OF SHEET MATERIAL
Filed Dec. 16, 1952 2 Sheets-Sheet 2

Inventors
A. Samuel Berlin
Robert J. Classen
Charles F. Novak
Frank L. Hawkins

By George Renehan
Attorney

United States Patent Office 2,723,554
Patented Nov. 15, 1955

2,723,554

APPARATUS FOR TESTING SELF-SEALING PROPERTIES OF SHEET MATERIAL

Aaron Samuel Berlin, Wilmington, Del., and Robert J. Classen, Bel Air, Charles F. Novak, Baltimore, and Frank L. Hawkins, Bel Air, Md., assignors to the United States of America as represented by the Secretary of the Army Application December 16, 1952, Serial No. 326,372

2 Claims. (Cl. 73—40.7)

(Granted under Title 35, U. S. Code (1952), sec. 266)

The invention described herein may be manufactured and used by or for the Government of the United States of America for governmental purposes without the payment to us of any royalty thereon.

The invention relates to testing apparatus and specifically to a device for testing and evaluating the self-sealing properties of various compounds. An object of this invention is to provide a unitary piece of apparatus which is capable of testing the self-sealing properties of various compounds such as natural or synthetic rubber compounds, which includes structure for puncturing a specimen of one of said compounds and structure for measuring the ability of said specimen to seal the puncture.

Another object of the invention is to provide apparatus for measuring the self-sealing properties of rubber and other compounds wherein structure is included for rupturing a sample disk of one of said compounds, for introducing a fluid under pressure on one side of said disk, and for measuring the pressure of said fluid so as to facilitate detection of any loss of fluid pressure through the rupture in the disk.

A further object of this invention is to provide apparatus for testing the self-sealing properties of rubber and other compounds which includes structure for cutting a sample disk of one of said compounds, structure for providing a liquid medium on one side of said cut and fluid under pressure on the other side, whereby leakage of the fluid under pressure through the cut can be visually observed as bubbling through said liquid.

Figure 1:
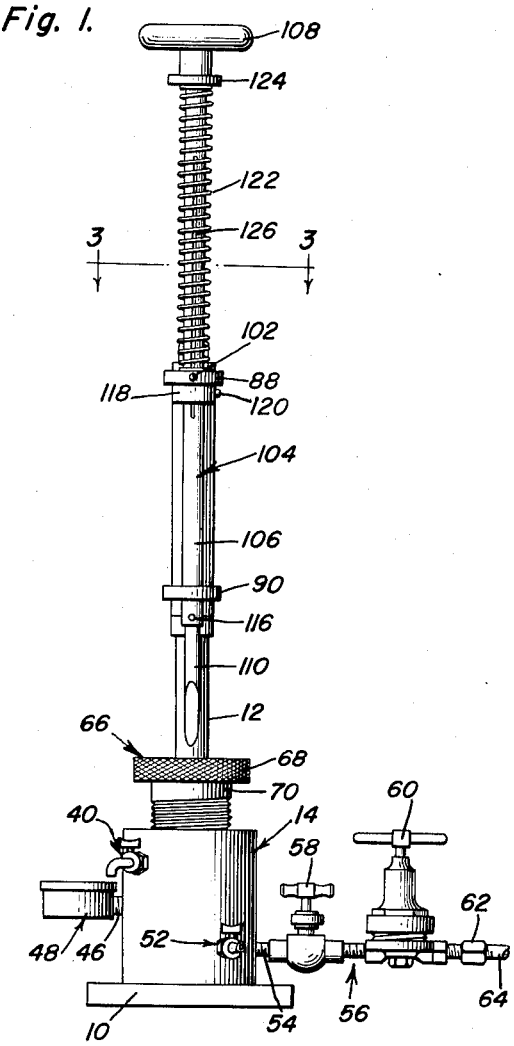
Figure 2:
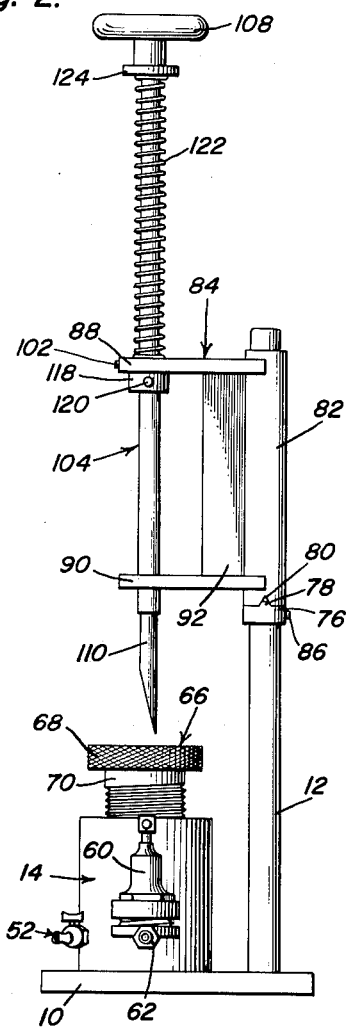
Figure 3:
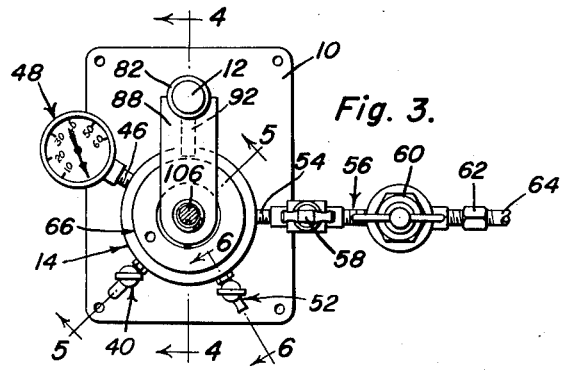
Figure 4:
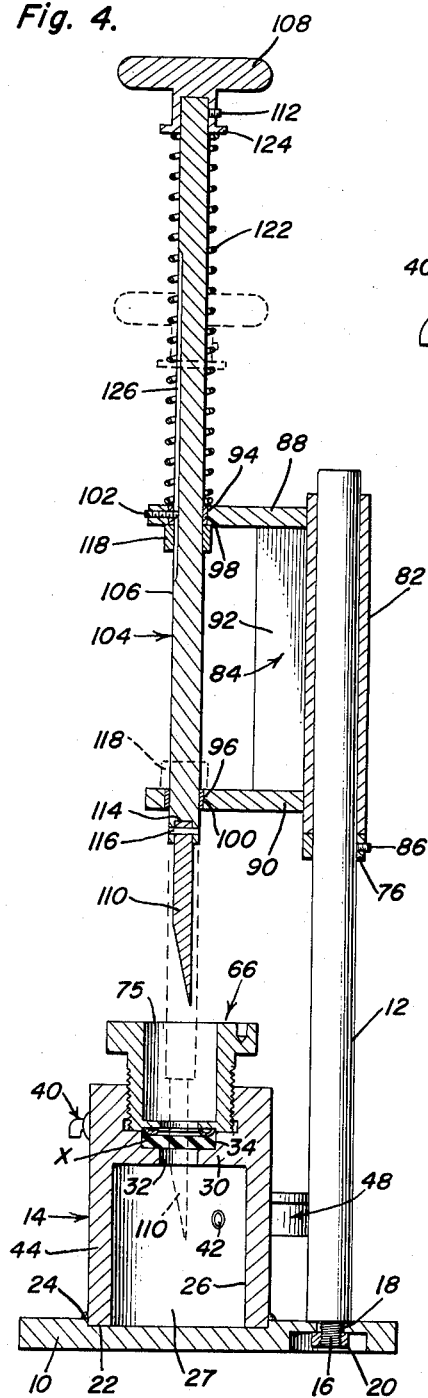
Figure 5:
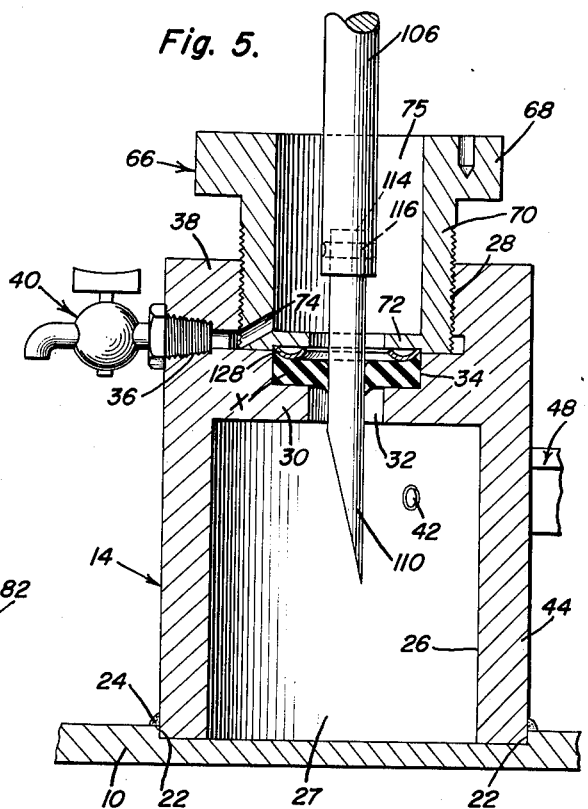
Figure 6:
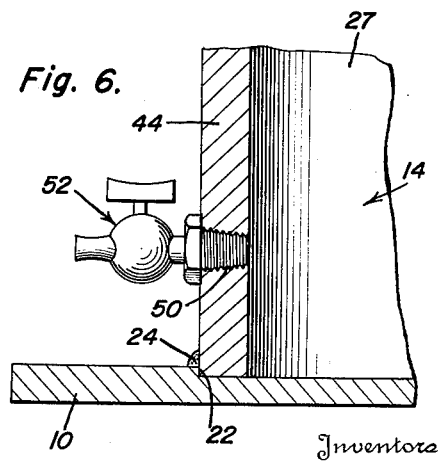

These and other objects will become apparent from the following description and claims viewed in the light of the accompanying drawings which form a part of this application, in which:

Fig. 1 is a front elevation view of apparatus.
Fig. 2 is a side elevation view of the apparatus.
Fig. 3 is a sectional view taken on line 3—3 of Fig. 1.
Fig. 4 is a sectional view taken on line 4—4 of Fig. 3.
Fig. 5 is a sectional view taken on line 5—5 of Fig. 3.
Fig. 6 is a sectional view taken on line 6—6 of Fig. 3.

Referring to the drawings for detailed description of the apparatus, reference numeral 10 indicates the base of the apparatus which supports vertically disposed guide rod 12 and the main housing 14. Guide 12 is rigidly secured to the base 10 by means of its threaded end 16 which passes through aperture 18 of said base and receives nut 20 (see Fig. 4). The main housing 14 is generally cylindrical and is seated in circular recess 22 which is formed in the base 10 and joined thereto by weld 24 or its equivalent.

Referring to Figs. 4 and 5, it will be seen that the main housing 14 has a cylindrical, axial bore 26 that extends from its lower end to a point approximately two-thirds the length of said housing from said end, which co-operates with base 10 to form a pressure fluid chamber 27. The main housing has a second bore 28 of smaller diameter than bore 26 which extends from the upper end of said housing to a point short of joining bore 26, thereby providing a radial wall 30 between said bores. Wall 30 has an opening 32 formed therein which extends from the side of said wall nearest bore 26 to a point midway through said wall where it joins larger opening 34 which communicates with bore 28, thereby placing bores 28 and 26 in communication with each other. Main housing 14 has a conically-shaped passageway 36 formed therein which extends laterally through the annular wall 38 that surrounds bore 28 (see Fig. 5). A conventional, manually operated valve 40 is mounted in said passageway. Main housing 14 has a threaded aperture 42 formed in the annular wall 44 that surrounds bore 26, which receives the threaded mounting portion 46 of conventional gauge 48 (see Figs. 1, 3 and 4). Annular wall 44 of main housing 14 has another threaded aperture 50 formed therein which receives a conventional, manually operated valve 52 (see Fig. 6). The relative positions of gauge 48 and valves 40 and 52 can be seen in Fig. 3 where it will also be seen that the annular wall 44 of main housing 14 has still another opening (not shown) formed therein which receives the threaded mounting portion 54 of the pressure fluid line 56, which includes manually operated control valve 58 and pressure regulating valve 60. Coupling 62 formed on the end of line 56 is adapted to be connected to a source 64 of fluid under pressure. In Figs. 4 and 5, it will be seen that the annular wall 38 of main housing 14 is internally threaded and adapted to receive externally threaded, cup-shaped member 66, which comprises knurled head portion 68, reduced cylindrical portion 70, and a radially, inwardly extending, apertured wall 72. Cylindrical portion 70 has an opening 74 formed therein which places the interior 75 of the cup-shaped member 66 into communication with the conically-shaped passageway 36 when said cup-shaped member is fully mounted in said main housing.

Guide rod 12 supports positioning collar 76 in fixed relation thereto. Collar 76 has a plurality of upwardly extending V-shaped projections 78 formed thereon (see Fig. 2) which are adapted to be received within V-shaped notches 80 which are formed in the sleeve portion 82 of the plunger guide assembly 84. Collar 76 may be moved on guide 12 and fixed in any position relative thereto by set screw 86. Plunger guide assembly 84 includes horizontally extending, parallel arms 88 and 90, each of which is rigidly fixed at one of its ends to the sleeve 82, and which have a strengthening web 92 secured therebetween and to said sleeve. Arms 88 and 90 have aligned openings 94 and 96 respectively formed thereon which are adapted to receive bushings 98 and 100 respectively. The end of the upper arm 88 opposite to the end thereof which is secured to sleeve 82 is provided with a horizontally disposed, threaded aperture which receives guiding bolt 102. The aligned bushings 98 and 100 slidably receive knife-carrying plunger assembly 104 which generally comprises shaft portion 106, handle 108 and the cutting blade 110 (see Fig. 4). The handle 108 is secured to the upper end of shaft 106 by set screw 112, and the cutting blade 110 is received within the recess 114 formed in the lower end of shaft portion 106 and fixed thereto by securing rivet or bolt 116. Stop 118 is adjustably mounted on the shaft portion 106 between the arms 88 and 90 and may be secured at any point therebetween by set-screw 120 (see Fig. 2). Compression spring 122 is positioned concentrically around the shaft portion 106 and abuts the upper surface of arm 88 and the lower surface of the annular flange 124 formed on the handle 108. Shaft portion 106 has a vertical keyway 126 fromed therein which is adapted to receive guiding bolt 102 (see Figs. 1 and 4).

This above-described apparatus operates in the following manner: Cup-shaped member 66 is removed from the main housing 14 and a disk X of sample material is placed in the opening 34. A washer 128 is placed on the disk X and the cup-shaped member 66 threaded back into the position shown in Fig. 4. Downwardly directed force exerted on the handle 108 moves the knife-carrying plunger assembly 104 vertically downwardly. During this movement the shaft portion 106 of knife-carrying plunger assembly 104 is vertically guided by the arms 88 and 90 and rotation thereof is prevented by the guiding screw 102 riding in the keyway 126. The compression spring 122 is compressed during this downward movement until the stop 118 reaches the upper surface of the lower arm 90 (as is shown in phantom lines in Fig. 4). When this position is reached, the cutting blade 110 will have fully penetrated the disk X of the sample material (shown in phantom lines in Fig. 4). Upon release of the force on the handle 108, the compression spring 122 expands and moves the knive-carrying, plunger assembly 104 upwardly to its original position (shown in full lines in Fig. 4). The valve 40 is then closed and a liquid such as water is placed in the interior 75 of cup-shaped member 66. Then the valve 52 is closed and the valve 58 opened thereby permitting fluid under pressure to enter into the chamber 27. The pressure of the fluid admitted into the chamber is controlled by the regulating valve 60. When a desired pressure is reached in the chamber, as indicated by the gauge 48, the valve 58 is closed. If the rupture in the sample disk X has fully sealed itself, the pressure will remain constant. A drop in pressure registered by the gauge 48 or the appearance of bubbles in the liquid in the interior 75 of the cup-shaped member 66 indicates leakage through the sample disk X. This pressure loss may be observed and compared to any standard for an evaluation of the relative self-sealing properties of the sample disk. Prior to testing other sample disks it is necessary to drain the liquid out of the interior 75 of the cup-shaped member 66 by opening the valve 40, and to release the fluid under pressure from the chamber 27 by opening valve 52. The cup-shaped member 66 must then be removed and the sample disk X replaced by the next sample disk to be tested. The puncture in the sample disk X may then be physically examined.

From the above, it should be apparent that this apparatus provides a compact, unitary structure for testing the self-sealing properties of various materials such as rubber compounds. Its ease of operation, accuracy, dependability and relative simplicity of structure are attributes which make it a practical, useful piece of apparatus not heretofore provided for in the art. While we have described one embodiment of our invention in great detail, it should not be limited to the precise structure disclosed for it is susceptible to various changes and modifications by those skilled in the art without departing from the spirit of the invention or exceeding the scope of the following claims.

We claim:

1. Apparatus for testing comprising a base, a chambered housing secured to said base, an apertured wall in said housing separating the chambers in said housing, said housing secured to said base in such a manner as to place said chambers in vertical alignment, means for admitting fluid under pressure communicating with the lower chamber, means for measuring pressure communicating with said lower chamber, a counterbore in said apertured wall on the upper side thereof of larger diameter than the aperture therein which is adapted to receive a sample of self-sealing material to be tested, the upper chamber open at its upper end and internally threaded, an externally threaded cup-shaped member having an apertured bottom wall adapted to be mounted in said upper chamber and to contact the sample and force it against said wall, a vertically disposed platform secured to said base, horizontally extending arms secured to said platform having openings therein that are in vertical alignment with each other and with the apertures in the bottom of said cup-shaped member and said wall, a reciprocable shaft mounted in the openings in said arms, said shaft having a downwardly extending, cutting blade at its lower end, a spring normally urging said shaft to an upper position wherein said cutting blade is spaced from said housing, said shaft being adapted to be moved to a lower position wherein said cutting blade is positioned within said apertures and a portion thereof extends into said lower chamber.

2. Apparatus for testing comprising a base, a chambered housing secured to said base, an apertured wall in said housing separating the chambers in said housing, said housing secured to said base in such a manner as to place said chambers in vertical alignment, means for admitting fluid under pressure communicating with said lower chamber, means communicating with said lower chamber for measuring the fluid pressure therein, a counterbore in said apertured wall on the upper side thereof of larger diameter than the aperture therein, a sheet of self-sealing material mounted in said counterbore and covering said aperture, said upper-chamber being open at its upper end and internally threaded, and externally threaded cup-shaped member having an apertured bottom wall, said cup-shaped member being mounted in said upper chamber with its bottom wall firmly contacting said sheet of self-sealing material, a vertically disposed platform secured to said base, horizontally extending arms secured to said platform having openings therein that are in vertical alignment with each other and with the apertures in the bottom of said cup-shaped member and said wall, a reciprocable shaft mounted in the openings in said arms, said shaft having a downwardly extending, cutting blade at its lower end, a spring normally urging said shaft to an upper position wherein said cutting blade is spaced from said housing, said shaft being adapted to be moved to a lower position wherein said cutting blade is positioned within said apertures and a portion thereof extends into said lower chamber.

References Cited in the file of this patent

UNITED STATES PATENTS

| Number | Name | Date |
| --- | --- | --- |
| 669,529 | Kennedy | Mar. 12, 1901 |
| 983,962 | Werner | Feb. 14, 1911 |
| 1,539,937 | Cochrane | June 2, 1925 |
| 1,926,474 | Allen | Sept. 12, 1933 |
| 2,493,967 | Hendricks | Jan. 10, 1950 |
| 2,618,152 | Kissinger | Nov. 18, 1952 |